Aug. 19, 1969  R. D. BEHR  3,462,053
METHOD AND APPARATUS FOR PROCESSING FILM HAVING BEADED PORTIONS
Filed Nov. 8, 1967
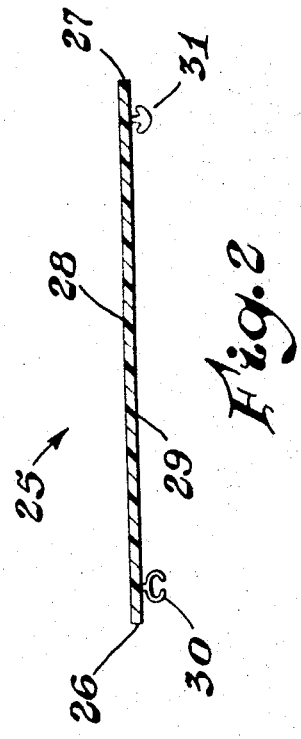
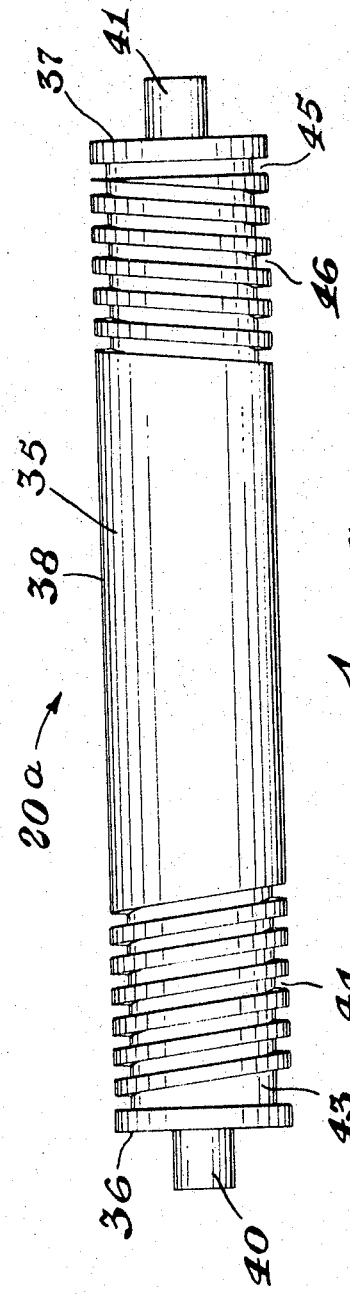
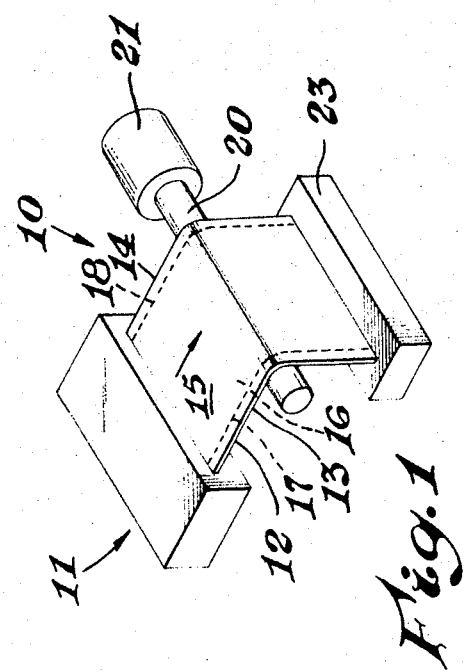
INVENTOR.
Raymond Douglas Behr
BY
AGENT

United States Patent Office 3,462,053
Patented Aug. 19, 1969

3,462,053
METHOD AND APPARATUS FOR PROCESSING FILM HAVING BEADED PORTIONS
Raymond Douglas Behr, Midland, Mich., assignor to The Dow Chemical Company, Midland, Mich., a corporation of Delaware
Filed Nov. 8, 1967, Ser. No. 681,387
Int. Cl. B65h 23/02, 27/00, 17/00
U.S. Cl. 226—6             7 Claims

ABSTRACT OF THE DISCLOSURE

Film having beads disposed adjacent the edge portion is readily maintained in a flattened condition by passing film over a roll having threaded portions of opposite hand disposed generally adjacent opposite ends, the roll having circumferential grooves generally corresponding to the beaded portions of the film.

---

This invention relates to a method and apparatus for the handling of films or flexible webs having beaded or raised portions generally adjacent the edge portion thereof, and more particularly relates to a method and apparatus for handling synthetic resinous films which have a tendency to wander and/or wrinkle when being passed over a roll.

Oftentimes, it is desirable to prepare webs having disposed thereon beaded portions. For example, several varieties of closures for synthetic resinous bags and the like are known wherein a film or sheet is produced having a male bead adjacent one edge and a female bead adjacent the opposite edge. The film may be folded, the beads engaged and a plurality of transverse seals made and a plurality of reclosable bags prepared by severing the film adjacent the seals. Other beaded edge films are known and used in tentering operations wherein a flat sheet is extruded and beads or enlarged portions disposed along the edges of the extruded sheet in order to provide a gripping means for a tentering frame. Oftentimes a sheet is pretreated and passes over one or more rolls prior to being gripped by the tentering frame. Frequently, due to inequalities in the apparatus and the raw materials employed to fabricate such a beaded edge sheet, the sheet may have minor variations therein which cause a tendency to wander or change position on a supporting roll frequently resulting in wrinkling and/or misalignmet of the sheet in the forwarding and processing equipment.

It would be beneficial if there were available an improved processing apparatus for handling beaded edge sheet.

It would also be advantageous if there were an improved method for maintaining a beaded edge sheet in a generally fixed position when passing over a roll.

It would also be advantageous if there were available an improved method and apparatus which would permit repositioning a beaded edge web on a roll in the event that the web is mispositioned.

These benefits and other advantages are achieved in accordance with the method of the present invention in a process which comprises supplying a beaded edge web having first and second edge beads, passing the beaded edge web to a web processing means in continuous form, the improvement which comprises passing a beaded edge web over a generally cylindrical rotatable configuration, disposing the web in such a manner that the edge beads are adjacent to the cylindrical configuration, the cylindrical configuration having a first end and a second end and first and second circumferential grooves disposed adjacet the first and second ends, respectively, the configuration defining first and second helical grooves, the first and second helical grooves being of opposite hand and being disposed and in communication with the circumferential grooves, rotating the cylindrical configuration in a direction to cause the first and second helical grooves to appear to travel toward the first and second circumferential grooves, respectively, and disposing the first and second edge beads in the first and second circumferential grooves, respectively.

Also contemplated within the scope of the present invention is a device for the handling of beaded edge webs which comprises a cylindrical roll, the cylindrical roll comprising a generally cylindrical body having a first end and a second end and an axis of rotation, the axis of rotation being generally co-axial with the axis of generation, the roll having a generally cylindrical web engaging surface, the roll defining first and second circumferential grooves disposed adjacent the first and second ends, respectively, first and second helical grooves being of opposite hand and adjacent to and in communication with the first and second circumferential grooves, respectively. The first and second helical grooves being disposed in generally adjacent relationship and the circumferential grooves being generally remote from each other. The device of the present invention is particularly suitable for combination within an apparatus comprising a web supply means, a roll support and rotating means and a web processing means.

Further features and advantages of the present invention will become more apparent from the following specification taken in connection with the drawing wherein:

FIGURE 1 depicts an apparatus in accordance with the present invention.

FIGURE 2 depicts one variety of beaded edge film handled with particular advantage.

FIGURE 3 is a plan view of a roll particularly suited for use in the apparatus of FIGURE 1.

In FIGURE 1 there is depicted schematically an apparatus in accordance with the present invention generally designated by the reference numeral 10. The apparatus 10 comprises in cooperative combination a source 11 which has issuing therefrom a web 12 having a first edge 13 and a second edge 14, a first face 15 and a second face 16. Generally adjacent the first edge 13 on the second face 16 is disposed an elongate bead 17. A second bead 18 is also disposed on the face 16 adjacent the second edge 14. The web 12 passes over a roll 20 in accordance with the present invention. The roll 20 is supported and rotated by a driving means or motor 21. From the roll 20, the web is passed to a processing means 23 such as a folding mechanism where it is formed into a desired configuration.

In FIGURE 2 there is depicted a cross-sectional view of a web 25. The web 25 has a first edge 26 and a second edge 27, a first major face 28 and a second major face 29. A female bead 30 is disposed on the second face 29 adjacent the first edge 26. A male bead 31 is disposed on the second face 29 generally adjacent the second edge 27. The bead 31 is adapted to engage the bead 30 and interlock therewith to form a continuous closure.

In FIGURE 3 there is depicted a plan view of a roll 20a similar to the roll 20 of FIGURE 1 wherein the detail of the surface configuration is shown. The roll 20a comprises a generally cylindrical body portion 35 having a first end 36 and a second end 37. The body portion 35 has a generally cylindrical or film support surface 38. A first support and rotating means 40 is in operative connection with the first end 36 and is generally axially disposed. A similar support and rotating means 41 is affixed to the second end 37. The roll body 35 defines a first circumferential groove 43 disposed adjacent the first end 36 and extending entirely thereabout. The body defines a first helical groove 44 which extends from the circumferential groove 43 toward the second end 37 and is arbitrarily designated as right hand configuration. The grooves 43 and 44 are in full communication with each other. A second circumferential groove 45 is disposed adjacent the second end 37 and is in communication with a second helical groove 46 which extends from the second circumferential groove 45 toward the first end 36. Thus, in effect, the first and second helical grooves 44 and 46 extend inwardly from the circumferential grooves 43 and 45, respectively.

In the apparatus of FIGURE 1 employing a roll such as is depicted in FIGURE 3, film or sheet is passed over the surface of the roll with the beaded portions in contact therewith. Beneficially, the roll is sized to the spacing of the beads in such a manner that the circumferential grooves 43 and 45 are in a position which correspond to beads such as the beads 30 and 31. As the web is passed over the surface 38 and the roll is rotated in an appropriate direction to cause apparent outward movement of the grooves on rotation, a very minor and gentle stretching action is imparted to the web which removes wrinkles therefrom. If, for some reason, displacement of a moving web occurs, such as rapid lateral movement of the web due to some unforseen external influence, one or the other of the beads will engage one of the helical grooves and be quickly forced into the associated circumferential groove where it will remain until otherwise disturbed.

Apparatus generally in accordance with the invention has been successfully employed for the handling of synthetic resinous thermoplastic webs having interfitting beads prepared from polyethylene and has been found to be eminently satisfactory.

As is apparent from the foregoing specification, the present invention is susceptible of being embodied with various alterations and modifications which may differ particularly from those that have been described in the preceding specification and description.

What is claimed is:

1. A method for the handling of beaded edge webs having first and second edge beads, the steps of the method comprising
    passing the beaded edge web to a processing means, the web being in continuous form, the improvement which comprises,
    passing the beaded edge web over a generally cylindrical rotatable configuration,
    disposing the web in such a manner that the edge beads are adjacent to the cylindrical configuration, the cylindrical configuration having a first end and a second end, and first and second circumferential grooves disposed adjacent the first and second ends, respectively, the configuration defining first and second helical grooves, the first and second helical grooves being of opposite hand and being disposed in communication with the circumferential grooves.
    rotating the configuration in such a manner to cause the first and second helical grooves to appear to travel toward the first and second circumferential grooves, respectively, and
    disposing the first and second edge beads in the first and second circumferential grooves, respectively.

2. The method of claim 1 wherein the web is a synthetic resinous thermoplastic web.

3. The method of claim 2 wherein the web is polyethylene.

4. The method of claim 3 wherein the beaded edge portions have the beads disposed on one surface of the web.

5. A device for the handling of beaded edge webs which comprises
    a cylindrical roll, the cylindrical roll comprising,
    a generally cylindrical body having a first end and a second end and an axis of rotation, the axis of rotation being generally coaxial with the axis of generation, the roll having,
    a generally axial web engaging surface, the roll defining first and second circumferential grooves disposed adjacent the first and second ends, respectively,
    first and second helical grooves being of opposite hand and adjacent to and in communication with the first and second circumferential grooves, respectively, the first and second helical grooves being disposed in generally adjacent relationship and the circumferential grooves being generally remote from each other.

6. The device of claim 5 in operative combination with
    a web supply means,
    a roll support and rotating means rotating said cylindrical roll, and
    a web processing means.

7. The apparatus of claim 5 wherein said circumferential grooves and said helical grooves are adapted to receive a web bead.

References Cited

UNITED STATES PATENTS

| | | | |
|---|---|---|---|
| 911,490 | 2/1909 | Gegenheimer | 26—65 |
| 1,826,862 | 10/1931 | Batson | 26—65 X |
| 3,063,090 | 11/1962 | Koppehele | 26—63 X |
| 3,109,218 | 11/1963 | Morgan | 26—63 |
| 3,138,824 | 6/1964 | Brown et al. | 26—65 X |
| 3,288,298 | 11/1966 | Daugherty et al. | 26—65 X |

ALLEN N. KNOWLES, Primary Examiner

18—1; 26—65; 226—52, 190